(12) United States Patent
Schiffner et al.

(10) Patent No.: US 7,878,699 B2
(45) Date of Patent: Feb. 1, 2011

(54) DRIVE FOR MIXING DRUM WITH ELASTIC ELEMENT ARRANGED BETWEEN BEARING INCORPORATING DRIVE SYSTEM AND BASE

(75) Inventors: Klaus Schiffner, Bad-Neuenahr-Ahrweiler (DE); Andreas Geier, Jandelsbrunn (DE); Eduard Heilig, Friedrichshafen (DE); Michael Frondorf, Eltorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 953 days.

(21) Appl. No.: 11/659,417

(22) PCT Filed: Aug. 8, 2005

(86) PCT No.: PCT/EP2005/008584

§ 371 (c)(1),
(2), (4) Date: Feb. 5, 2007

(87) PCT Pub. No.: WO2006/015835

PCT Pub. Date: Feb. 16, 2006

(65) Prior Publication Data

US 2009/0034363 A1    Feb. 5, 2009

(30) Foreign Application Priority Data

| Aug. 7, 2004 | (DE) | ........................ | 10 2004 038 504 |
| Aug. 7, 2004 | (DE) | ........................ | 10 2004 038 506 |
| Dec. 1, 2004 | (DE) | ........................ | 10 2004 057 849 |
| Mar. 17, 2005 | (DE) | ........................ | 10 2005 012 823 |
| Mar. 23, 2005 | (DE) | ........................ | 10 2005 014 028 |
| Jun. 10, 2005 | (DE) | ........................ | 10 2005 027 038 |

(51) Int. Cl.
*B28C 5/42* (2006.01)

(52) U.S. Cl. ........................................................ 366/62
(58) Field of Classification Search ............. 366/53–63, 366/232–233; 494/82; 248/580, 599
See application file for complete search history.

(56) References Cited

U.S. PATENT DOCUMENTS

| 186,570   | A | 1/1877  | Huffman       |
| 2,265,053 | A | 12/1941 | Anderson      |
| 2,511,240 | A | 6/1950  | Bohmer et al. |

(Continued)

FOREIGN PATENT DOCUMENTS

AT           327 693           2/1976

(Continued)

*Primary Examiner*—Charles Cooley
(74) *Attorney, Agent, or Firm*—Davis & Bujold, P.L.L.C.

(57) ABSTRACT

A drive system for a mixer barrel for absorbing weight of the mixer barrel (1). The drive system communicates with a base (5) via a weight supporting element which supports the mixer barrel (1) and enables relative movement therebetween. The weight supporting element comprises at least one distortable elastic element (28, 29, 30, 39) enabling the movement between the drive system and the base (5). The at least one elastic element (28, 29, 30, 39) supports the weight of the mixer barrel (1) above the at least one elastic element (28, 29, 30, 39). The drive system (4) has at least one component (36) which limits movement of the drive system (4) and increases a distance between the drive system (4) and the base (5) such that a torque strain on the drive system (4) is braced by the base (5).

19 Claims, 7 Drawing Sheets

U.S. PATENT DOCUMENTS

| | | | |
|---|---|---|---|
| 2,895,722 A | | 7/1959 | Hunkins |
| 3,658,303 A | | 4/1972 | Funk |
| 3,749,372 A | * | 7/1973 | Funk .......................... 366/60 |
| 3,754,737 A | * | 8/1973 | O'Dea ......................... 366/61 |
| 3,756,572 A | * | 9/1973 | Buelow et al. ............... 366/61 |
| 3,785,622 A | * | 1/1974 | Johnson ....................... 366/63 |
| 3,825,232 A | | 7/1974 | Pecorari |
| 3,851,862 A | * | 12/1974 | Mihulowicz ................. 366/61 |
| 4,378,163 A | | 3/1983 | Jameson et al. |
| 4,425,813 A | | 1/1984 | Wadensten |
| 4,453,830 A | | 6/1984 | Jameson et al. |
| 4,575,254 A | | 3/1986 | Johnston |
| 5,149,126 A | | 9/1992 | Brennan |
| 5,348,387 A | * | 9/1994 | Gordon et al. ............... 366/63 |
| 5,820,258 A | * | 10/1998 | Braun ........................... 366/63 |
| 6,569,047 B2 | | 5/2003 | Grauby et al. |
| 6,689,160 B1 | | 2/2004 | Okuda et al. |

FOREIGN PATENT DOCUMENTS

| | | | |
|---|---|---|---|
| DE | 1 182 125 | | 11/1964 |
| DE | 23 41 250 | | 2/1975 |
| DE | 31 21 797 A1 | | 12/1982 |
| DE | 42 43 447 A1 | | 6/1994 |
| DE | 195 37 462 A1 | | 4/1997 |
| DE | 196 12 309 A1 | | 10/1997 |
| DE | 100 33 661 A1 | | 1/2002 |
| DE | 20 2004 020 370 U1 | | 6/2005 |
| EP | 1 186 390 A2 | | 3/2002 |
| EP | 1 186 802 A1 | | 3/2002 |
| FR | 2.146.053 | | 1/1973 |
| FR | 2.221.029 | | 10/1974 |
| GB | 543123 | | 2/1942 |
| GB | 668010 | | 3/1952 |
| GB | 1429276 | * | 3/1976 |
| JP | 56-10848 | | 2/1981 |
| SU | 1364486 A1 | | 1/1988 |
| WO | 2006/015839 A1 | * | 2/2006 |
| WO | WO-2006/015832 A1 | | 2/2006 |
| WO | WO-2006/015833 A1 | | 2/2006 |
| WO | WO-2006/015835 A1 | | 2/2006 |
| WO | WO-2006/015839 A1 | | 2/2006 |
| WO | WO 2006015832 A1 | * | 2/2006 |
| WO | WO 2006015833 A1 | * | 2/2006 |
| WO | WO 2006015834 A1 | * | 2/2006 |
| WO | WO 2006015837 A1 | * | 2/2006 |
| WO | WO-2006/131335 A2 | | 12/2006 |

* cited by examiner

DRIVE FOR MIXING DRUM WITH ELASTIC ELEMENT ARRANGED BETWEEN BEARING INCORPORATING DRIVE SYSTEM AND BASE

This application is a national stage completion of PCT/EP2005/008584 filed Aug. 8, 2005, which claims priority from German Application Serial No. 10 2005 027038.7 filed Jun. 10, 2005 which claims priority from German Application Serial No. 10 2005 014028.9 filed Mar. 23, 2005 which claims priority from German Application Serial No. 10 2005 012823.8 filed Mar. 17, 2005, which claims priority from German Application Serial No. 10 2004 057849.4 filed Dec. 1, 2004, which claims priority from German Application Serial No. 10 2004 038506.8 filed Aug. 7, 2004 and which claims priority from German Application Serial No. 10 2004 038504.1 filed Aug. 7, 2004.

FIELD OF THE INVENTION

The invention concerns a drive for a rotary barrel mixer, in particular a ready-mix mobile mixer.

BACKGROUND OF THE INVENTION

Drives for mobile mixers are intended for rotating the mixer barrel in order to convey the material to be mixed into the barrel when the direction of rotation is "fill" and to convey the mixed material out of the barrel when the direction of rotation is "empty". In addition, the mixer barrel is mounted above two bearing rollers at the rear end of the vehicle and above the drive system so that the drive system must absorb a significant portion of the weight of the mixer barrel. When driving across uneven ground, the vehicle frame twists so that the mixer barrel moves relative to the vehicle frame and this movement must be enabled or offset by the drive system, as the case may be.

DE 100 33 661 A1 discloses a drive system for a mixer barrel in which a hydraulic engine drives an interior bull gear of a planetary gear, whose exterior bull gear comprises the output and drives the mixer barrel. The weight of the mixer barrel is transferred to a housing, via a roller bearing. Relative movement of the mixer barrel to the vehicle frame while driving across uneven ground is enabled by way of a ball joint bearing as in FIG. 1, for example.

The present invention is based on the task of creating a drive system for a mixer barrel that will enable relative movement between the mixer barrel and the vehicle frame and is characterized by high operating reliability and is maintenance-free.

SUMMARY OF THE INVENTION

According to the invention, the drive system is connected, on the one hand, to the mixer barrel and, on the other, to a base that is also connected to the vehicle frame. Between the base and the drive system, there is an elastic element which, by way of its elastic deformation, enables or offsets the relative movement between the barrel and the vehicle frame. In addition, the drive system features at least one component that restricts movement of the drive system away from the base. This prevents the drive system from being lifted off the base, which can also happen, for example, due to alternating torque force. The means of enabling relative movement between the barrel and the vehicle frame preferably features a plurality of elastic elements that are arranged between the elements that prevent the mixer barrel or, as the case may be, the drive system from being lifted off the base. For this purpose, there is a U-shaped component connected to the drive system to accept the elastic elements. The elastic elements, which are situated between the arms of the "U", are interrupted by an additional component that is connected to the base. The arms of the "U" can be configured so that the elastic elements can be mounted as prestressed.

In a further embodiment, the elastic elements can be interrupted by metal components or, as the case may be, layered alternately with them. This results in greater spring stiffness. The component that interrupts the elastic elements and is fixedly attached to the base or which is formed as one piece with the base, displays circular recesses into which the elastic elements can be inserted. In addition, these components also feature a radial catch surface against which an additional elastic component lies and which braces itself against the U-shaped element that is connected to the drivesystem. The element that interrupts the elastic elements and is connected to the base displays additional radial catch surfaces, against which elastic elements are braced and which are connected to the plates of the drive system in order to absorb fluctuation forces, particularly when braking and accelerating the vehicle. Because the drive system features radial plates that are arranged at equal intervals around the hub of a circle, the plates being braced by elastic elements on the catch surfaces, it is possible to place additional catch surfaces between these radial plates and the catch surfaces that mechanically limit torsion of the drive system around the hub. This mechanically restricts torsion movement around the hub and the U-shaped elements prevent the drive system from being lifted off the base. By way of this elastic element configuration, it is possible to have a rigid construction of the additional drive system with the hydraulic engine and the reduction gear unit, which enables simple installation using commercially available roller bearings, for example, taper roller bearings. In order to achieve compact configuration of the drive system with the elastic element, it is advantageous to use at least one planetary gear as a taper roller bearing, whose interior bull gear serves as a drive and whose external bull gear forms the drive and drives the barrel.

A decoupling of the vehicle frame and barrel drive or, as the case may be, the barrel is achieved particularly through the interposition of elastic elements, which dampen noise and vibration.

In a further embodiment, there is the possibility of arranging the elastic element at frame height, which shortens the base and lengthens the drive system.

BRIEF DESCRIPTION OF THE DRAWINGS

The invention will now be described, by way of example, with reference to the accompanying drawings in which.

DETAILED DESCRIPTION OF THE INVENTION

Figure 1:
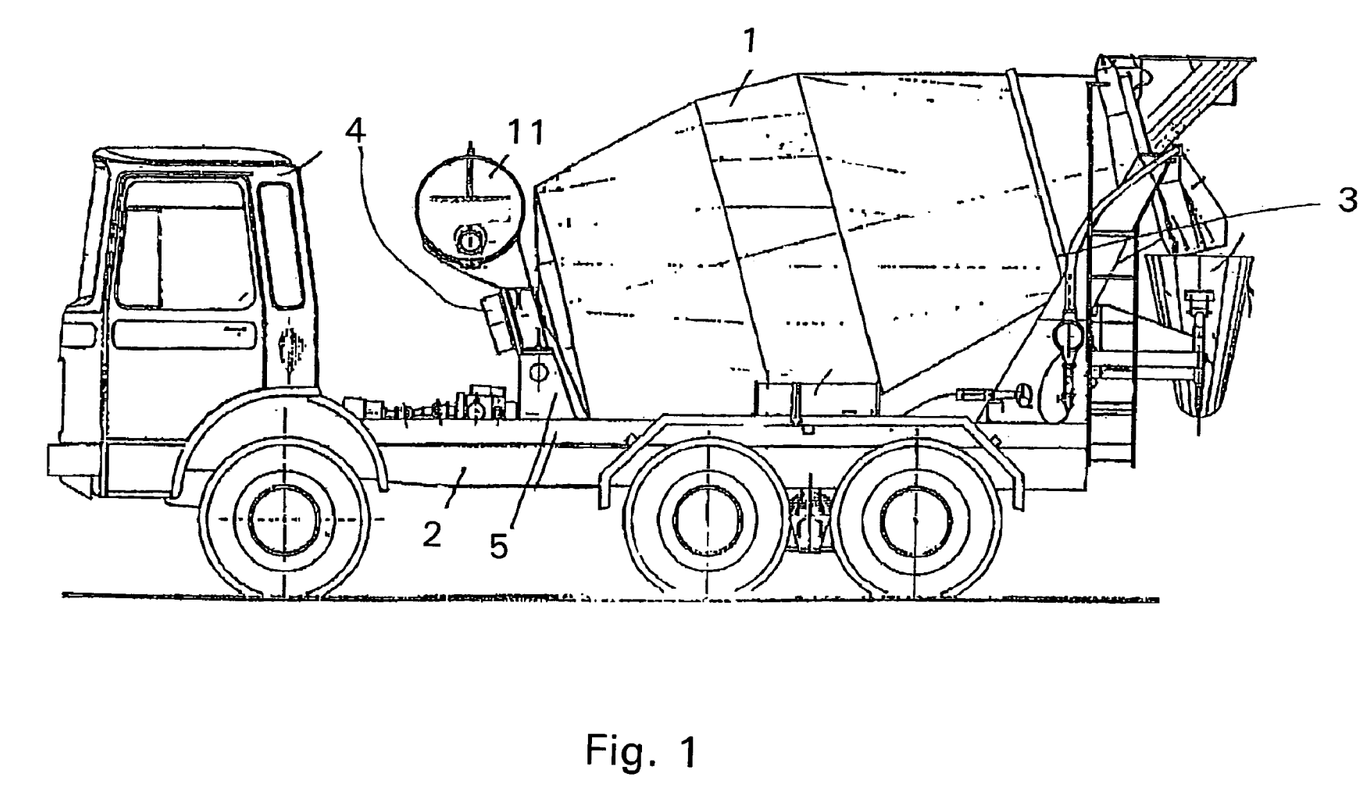
FIG. 1 is a mobile mixer.

FIG. 1:

A barrel 1 is mounted in a vehicle frame 2, on the one hand, above bearing rollers 3 and, on the other hand, above a drive system 4 for a mixer barrel. The drive system 4 is mounted on a base 5, and the base 5 is connected to the frame 2.

Figure 2:
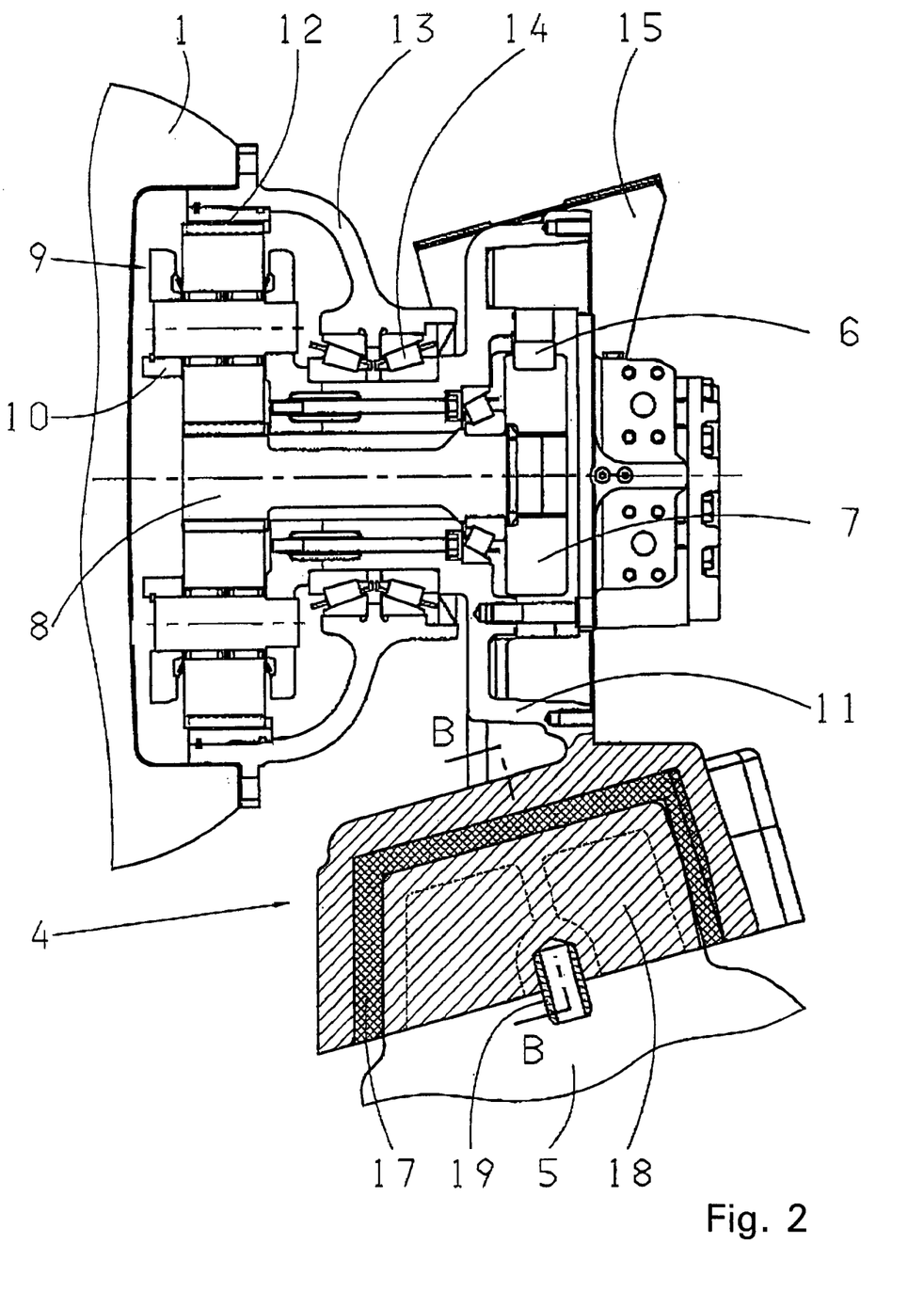
FIG. 2 is a drive system with a radial piston engine.

FIG. 2:

With its rotor 7, a slow-running radial piston engine 6 drives an interior bull gear 8 of a planetary gear 9. The planet carrier 10 is attached in a slip-free manner to a housing 11. An outer bull gear 12 is connected to an output flange 13, which is connected to the barrel 1. The output flange 13 is mounted on the housing 11 above a bearing 14, in particular a taper roller bearing. The housing 11 can feature a mounting plate 15, which is suitable for receiving a water tank 16. The drive system 4 is movably mounted above an elastic element 17 on a component 18. This component 18 is connected to the base 5 or is formed in one piece with it. The component 18 can be secured in the base 5 by way of an additional mechanical locking device, i.e., a pin 19.

Figure 3:
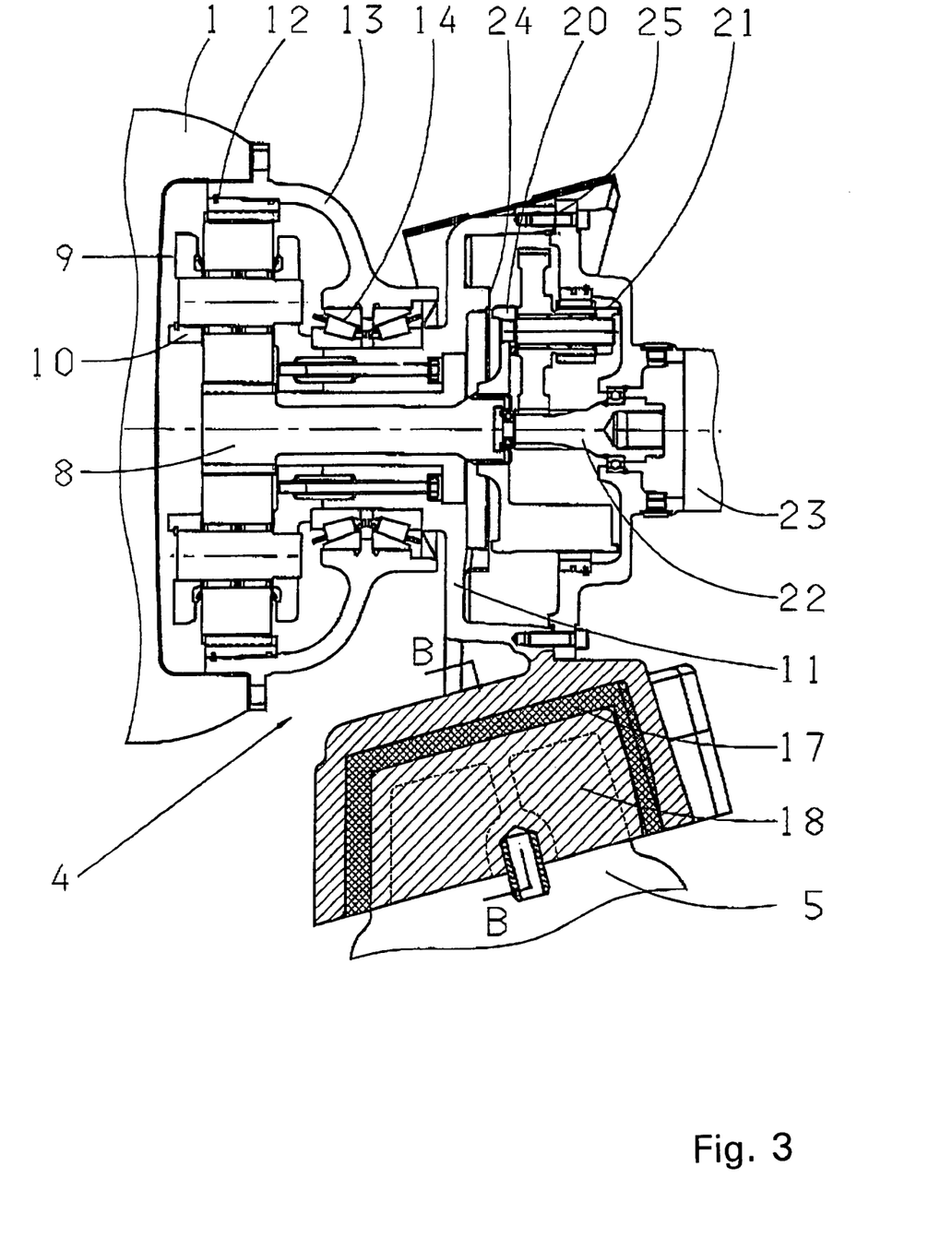
FIG. 3 is a drive system for using an axial piston engine.

FIG. 3:

The drive system 4 is different from the drive system, according to FIG. 2, only in that the interior bull gear 8 is driven by a planet carrier 20 of a second planetary stage 21, whose interior bull gear 22 is driven by an axial piston motor 23. It is also possible to replace the radial piston engine 6 or the axial piston motor 23 with an electric engine. The housing 11 features two flange-type surfaces 24 and 25, the flange-type surface 24 being configured for flange-type a radial piston engine 6 and flanging surface 25 for flanging a housing cover for the planetary stage 21.

Figure 4:
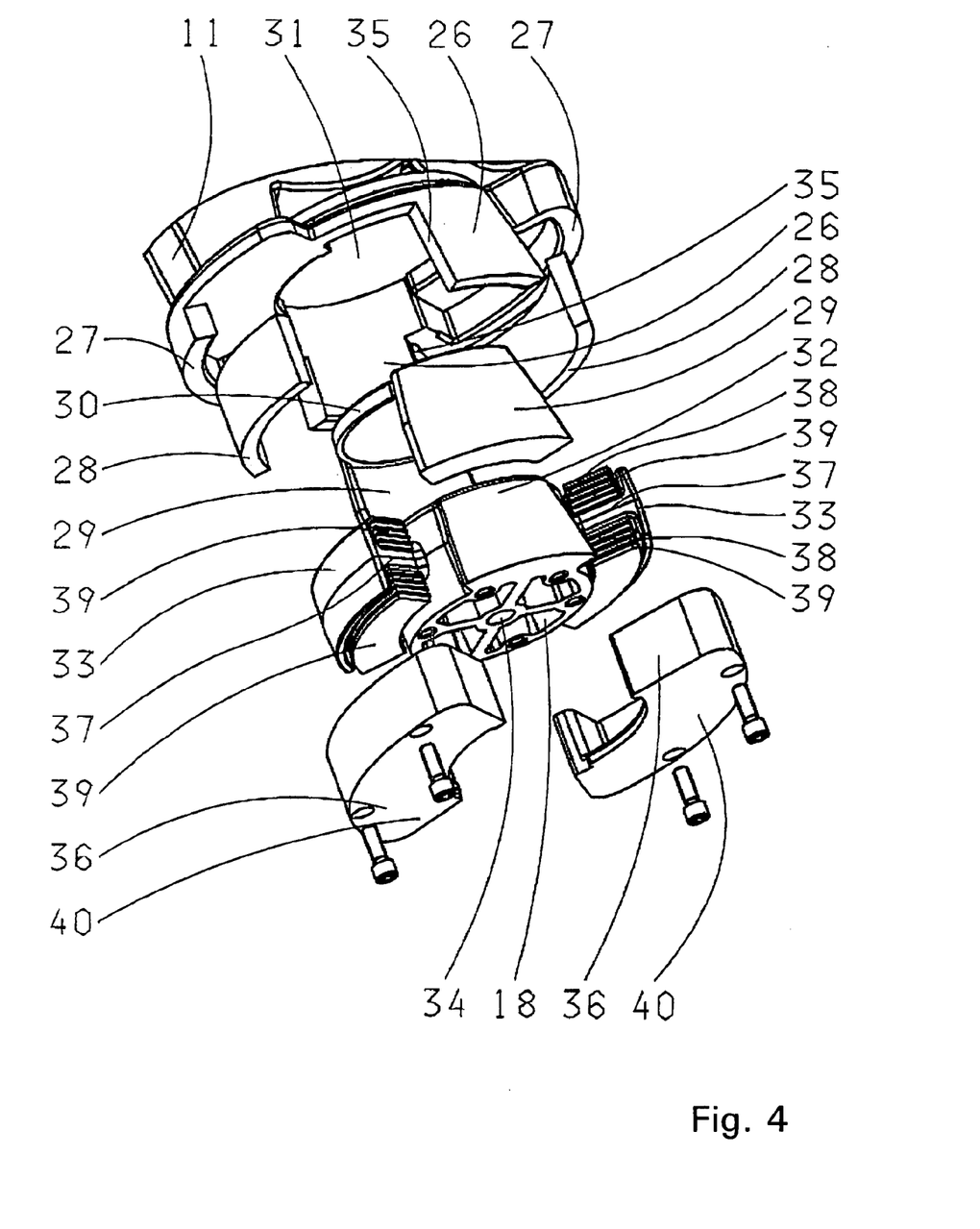
FIG. 4 is a diagram of the means for enabling movement between the base and the drive system.

FIG. 4:

This shows an exploded view of a section of a means for enabling movement between the base 5 and the drive system 4. The end of the housing 11 that faces the base 5 is presented in such a way that it shows two first radial flanges 26 and two second radial flanges 27. Elastic elements 28 are inserted into the radial flanges 27. Elastic elements 29, which also feature an elastic element 30 that moves against the housing 11 on a base 31, are inserted into the radial flanges 26. The component 18, which is connected to the base 5 by screw fittings and is additionally secured by the central pin 19, features flange-type surfaces 32, on which the elastic elements 29 lie, and catch surfaces 33, against which the elastic elements 28 rest. In that way, all the forces created by braking, accelerating or driving the vehicle in a curve can be transferred by the flanges 26 and 27, via the elastic elements 28 and 29, as well as 30, onto the catch surfaces 32 and 33 in the component 18 so that they can be conducted from there into the base 5. The weight of the barrel is conducted by the base 31, the elastic element 30 into the component 18. When driving over uneven ground, the vehicle frame 2 twists and the housing 11 contorts around a hub 34, which is made possible by the elastic elements. By way of an arrangement 35, which comes to rest on a U-shaped element 36, the contortion around the hub 34 is mechanically limited. The component 18 features an intermediate bar 37 which, together with the catch surfaces 33, forms recesses 38 into which elastic elements 39 are inserted. Preferably, the elastic elements 39 are layered alternately with metal elements, which can increase spring stiffness. Preferably L-shaped, the sections 40 are connected with the second radial flanges 27 in such a way that they, together with the flanges, form a U-shaped element 36, inside which the elastic elements 39, the bar 37, the catch surfaces 33 and the elastic elements 28 are arranged. The U-shaped element 36 is preferably configured so that the elastic elements 39 can be prestressed during mounting. The U-shaped elements 36 prevent a tipping of the drive system 4 into a rotary motion, in particular when the barrel is in operation, because the torque for driving the barrel can be braced, via the component 18, in the base 5. In connection with the elastic elements 39 and the bar 37, the U-shaped element 36 also prevents the housing 11 from being lifted off the base 5, especially with varying high torque values.

In a further embodiment, there is the possibility of configuring the housing 11 with the radial flanges 26 and 27 in more than one piece.

Figure 5:
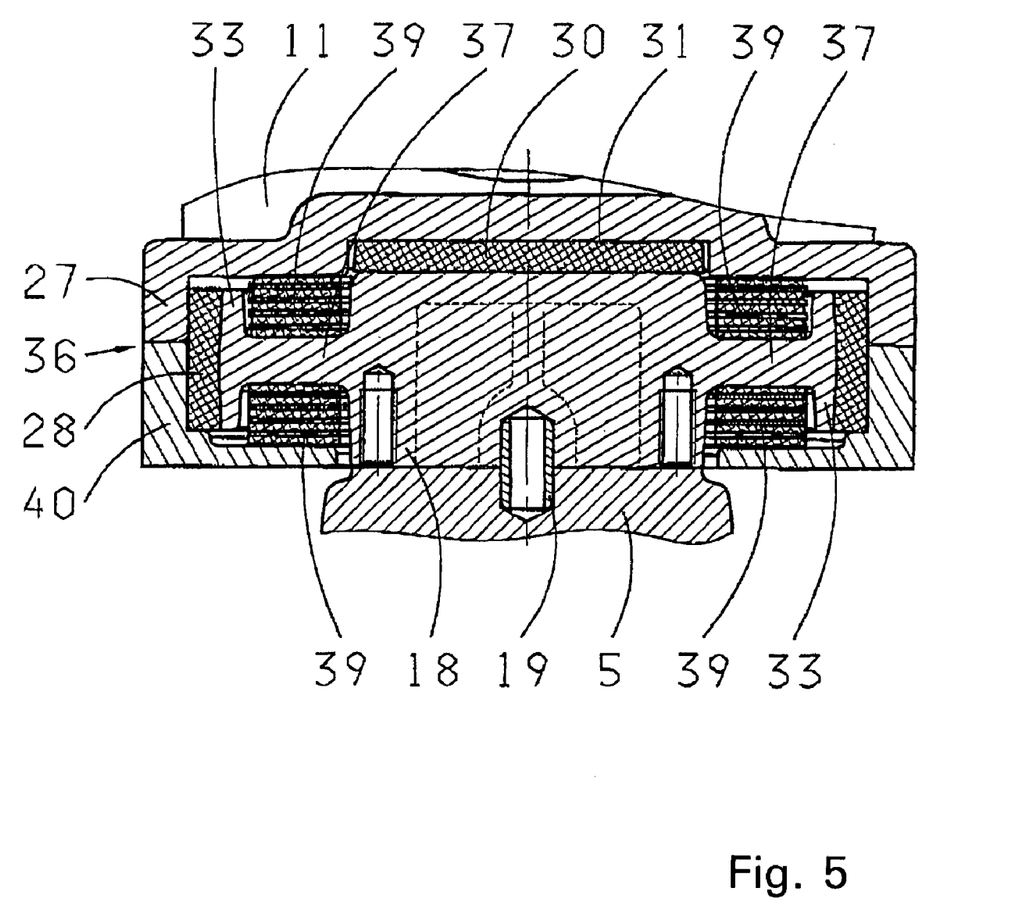
FIG. 5 is a cross-section through these instruments.

FIG. 5:

In this Figure, the arrangement in FIG. 4 is shown in assembled state.

Figure 6:
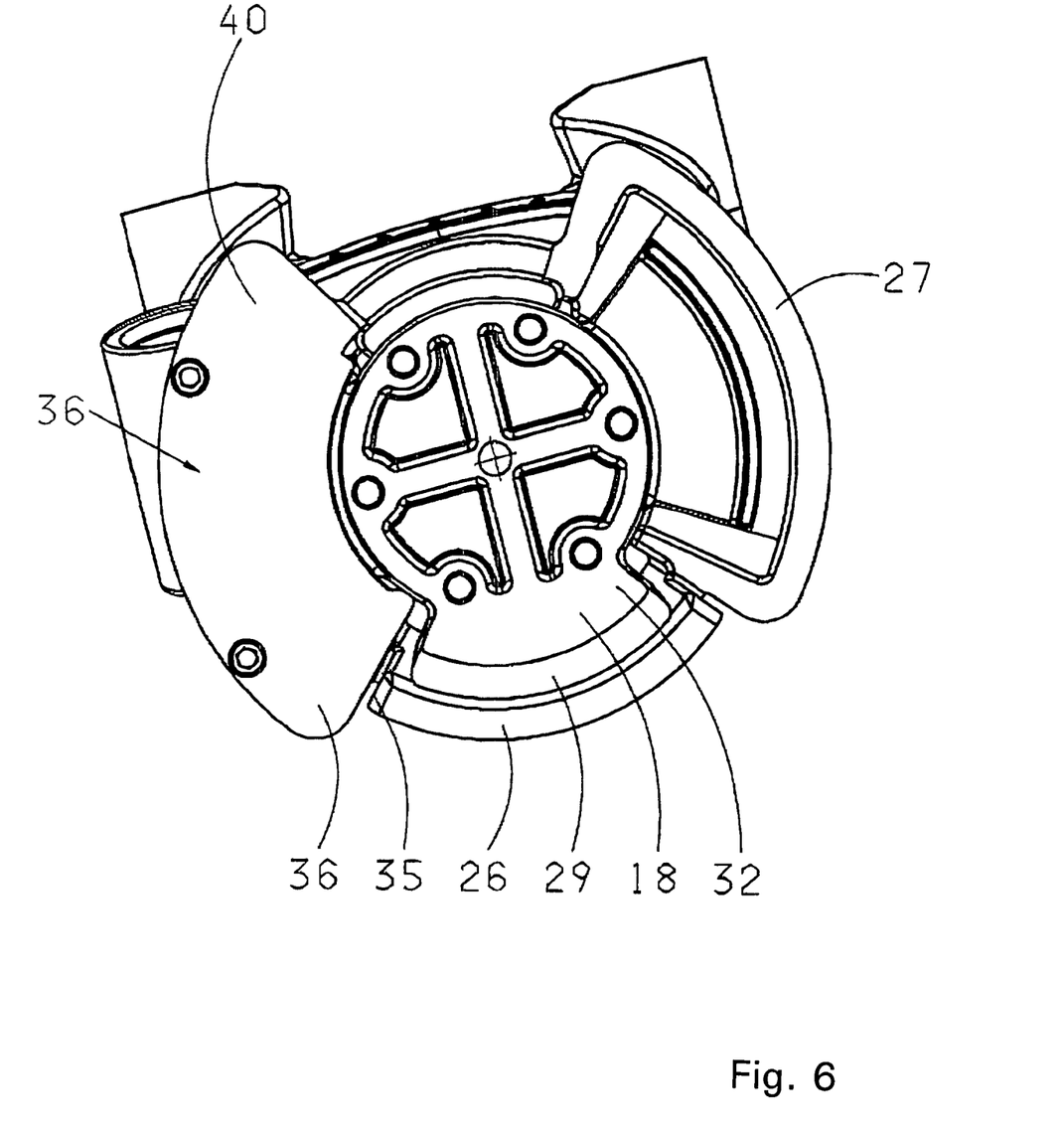
FIG. 6 is a bottom view of the drive system.

FIG. 6:

The arrangement 35 of the radial flange 26 can rotate out of position around the hub 34 until it rests against the U-shaped element 36. This ensures that when there is too much strain on the elastic elements, there are mechanical catches in the case of rotation of the drive system 4 toward the base 5 and mechanical catches from the catch surfaces 33 in the direction of the U-shaped element 36, with reference to lifting the drive system 4 toward the base 5, thus preventing overloading of the elastic elements.

This makes it possible to have a maintenance-free, simply constructed drive for a mixer barrel in which the bearings 14 can be simply constructed, because they do not have to perform compensatory movements between the barrel 1 and the frame 2, which means that the drive system can be simply constructed.

Figures 7A, 7B, 7C, 7D:
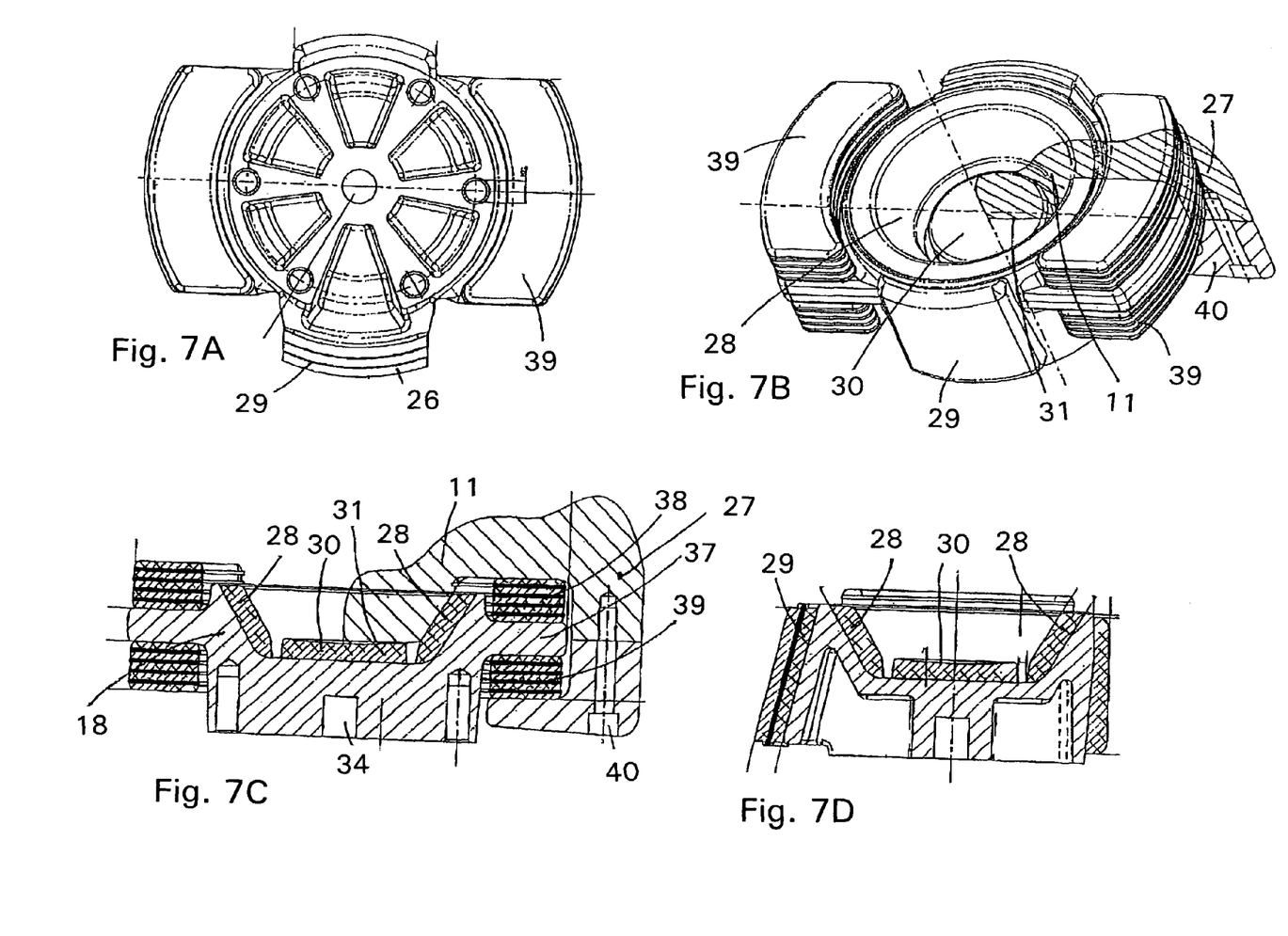
FIGS. 7A, 7B, 7C and 7D respectively are a diagrammatic top view, a diagrammatic perspective view, a diagrammatic cross sectional view and another diagrammatic cross sectional view which show various features of the central receiver for the elastic elements.

FIG. 7A is a diagrammatic top view to the central receiver for the elastic elements with the same elements, discussed above, being given the same reference numerals. FIG. 7B is a diagrammatic perspective view of the central receiver of FIG. 7A with the same elements, discussed above, being given the same reference numerals. FIG. 7C is diagrammatic cross sectional view of the central receiver for the elastic elements with the same elements, discussed above, being given the same reference numerals. FIG. 7D is diagrammatic cross sectional view of central region of the central receiver with the same elements, discussed above, being given the same reference numerals.

REFERENCE NUMERALS 1 barrel
2 vehicle frame
3 bearing rollers
4 drive system
5 base
6 radial piston engine
7 rotor
8 interior bull gear
9 planetary gear
10 planet carrier
11 housing
12 exterior bull gear
13 output flange
14 bearing
15 mounting plate
16 water tank
17 elastic element
18 component
19 pin
20 planet carrier
21 planet plate
22 interior bull gear 23 axial piston motor
24 flange-type surface
25 flange-type surface
26 first radial flange
27 second radial flange
28 elastic element
29 elastic element
30 elastic element
31 base
32 catch surfaces
33 catch surfaces
34 hub
35 arrangement
36 U-shaped element
37 bar
38 recesses
39 elastic elements
40 section

The invention claimed is:

1. A drive system for a mixer barrel, the drive system directly communicating with the mixer barrel (1) for rotationally driving the mixer barrel (1) and including a bearing (14) for rotatably supporting weight of a first end of the mixer barrel (1),
   the drive system, including the bearing, being supported by a base (5) via a weight supporting element so that the weight supporting element supports the weight of both the first end of the mixer barrel (1) and the drive system while enables relative movement between the drive system and the base (5),
   the weight supporting element comprising at least one distortable elastic element (28, 29, 30, 39) enabling the relative movement between the drive system, including the bearing, and the base (5), the at least one elastic element (28, 29, 30, 39) being located between the drive system (4) and the base (5), the at least one elastic element (28, 29, 30, 39) supporting the weight of the first end of the mixer barrel (1) above the at least one elastic element (28, 29, 30, 39), and
   the drive system (4) having at least one component (36) limiting movement of the drive system (4) which increases a distance between the drive system (4) and the base (5) such that a torque strain on the drive system (4) being braced by the base (5).

2. The drive for a mixer barrel according to claim 1, wherein the at least one elastic element (39) comprises at least two elastic elements (39) with at least one metal layer located between the at least two elastic elements (39).

3. The drive for a mixer barrel according to claim 1, wherein the weight supporting element further comprises a plurality of radial plates (26, 27) located at spaced intervals around a hub (34), and the plurality of radial plates (26, 27) are braced on radial catch surfaces (32, 33) by the at least one elastic element (28, 29), and the radial catch surfaces (32, 33) communicate with the base (5).

4. The drive for a mixer barrel according to claim 3, wherein the plurality of radial plates (27) limit the movement of the drive system (4) which increases a distance between the drive system (4) and the base (5).

5. The drive for a mixing drum according to claim 4, wherein the plurality of radial plates (27) and a limiting means (40) form a U-shaped element, two elastic elements (39) are located between the plurality of radial plates (27) and the limiting means (40), and a component (18), connected to the base (5), is located between the two elastic elements (39).

6. The drive for a mixer barrel according to claim 5, wherein the two elastic elements (39) are elastically arranged within the U-shaped element (36) to be pre-stressed.

7. The drive for a mixer barrel according to claim 5, wherein the component (18) located between the two elastic elements (39) has circular recesses (38) within which the two elastic elements (39) are located.

8. The drive for a mixer barrel according to claim 7, wherein the two elastic elements (39) located within the circular recesses (38) of the component (18) have alternating layers of elastic material and layers of metal elements.

9. The drive for a mixer barrel according to claim 5, wherein a component (18), located between the two of the elastic elements (39), is fixed to the base (5).

10. The drive for a mixer barrel according to claim 1, wherein the drive system (4) has a reduction gear (9) which contains at least one planetary gear in which an internal sun gear (8) is driven and an external ring gear (12) forms an output drive of the drive system (4) for driving the mixer barrel (1).

11. A drive system for a mixer barrel, the drive system directly communicating with the mixer barrel (1) for rotationally driving the mixer barrel (1) and including a bearing (14) for rotatably supporting weight of a first end of the mixer barrel (1),
   the drive system including a motor,
   the drive system, including the bearing and the motor, being supported by a base (5) via a weight supporting element such that the weight supporting element supports the weight of both the first end of the mixer barrel (1) and the drive system, including the bearing and the motor, while still enabling relative movement between the drive system and the base (5),
   the weight supporting element comprising at least one distortable elastic element (28, 29, 30, 39) enabling the relative movement between the drive system and the base (5), the at least one elastic element (28, 29, 30, 39) being located between the drive system (4) and the base (5), and the at least one elastic element (28, 29, 30, 39) supporting the weight of the first end of the mixer barrel (1) above the at least one elastic element (28, 29, 30, 39), and
   the drive system (4) having at least one component (36) limiting movement of the drive system (4) which increases a distance between the drive system (4) and the base (5) such that a torque strain on the drive system (4) being braced by the base (5).

12. The drive for a mixer barrel according to claim 11, wherein the motor is one of a radial piston motor, an axial piston motor and an electric motor.

13. The drive for a mixer barrel according to claim 11, wherein the at least one elastic element (39) comprises at least two elastic elements (39) with at least one metal layer located between the at least two elastic elements (39).

14. The drive for a mixer barrel according to claim 11, wherein the weight supporting element further comprises a plurality of radial plates (26, 27) located at spaced intervals around a hub (34), and the plurality of radial plates (26, 27) are braced on radial catch surfaces (32, 33) by the at least one elastic element (28, 29), and the radial catch surfaces (32, 33) communicate with the base (5).

15. The drive for a mixing drum according to claim 11, wherein the plurality of radial plates (27) and a limiting means (40) form a U-shaped element, two elastic elements (39) are located between the plurality of radial plates (27) and the limiting means (40), and a component (18), connected to the base (5), is located between the two elastic elements (39).

16. The drive for a mixer barrel according to claim 15, wherein the two elastic elements (39) are elastically arranged within the U-shaped element (36) to be pre-stressed.

17. The drive for a mixer barrel according to claim 15, wherein the component (18) located between the two elastic elements (39) has circular recesses (38) within which the two elastic elements (39) are located.

18. A drive system for a mixer barrel, the drive system directly communicating with the mixer barrel (1) for rotationally driving the mixer barrel (1) and including a bearing (14) for rotatably supporting weight of a first end of the mixer barrel (1), the drive system including a housing (11) accommodating a motor driving and an output gear, the drive system, including the housing, the bearing, the motor and the output gear, being supported vertically above a base (5) by a weight supporting element such that the weight supporting element supports the weight of the first end of the mixer barrel (1) and an entire weight of the drive system, including the housing, the bearing, the motor and the output gear, while still enabling relative movement between the drive system and the base (5), the weight supporting element comprising a plurality of distortable elastic elements (28, 29, 30, 39) enabling the relative movement between the drive system and the base (5), the plurality of distortable elastic elements (28, 29, 30, 39) being located between the drive system (4) and the base (5), and the plurality of distortable elastic elements (28, 29, 30, 39) supporting the weight of the first end of the mixer barrel (1) vertically above the at least one elastic element (28, 29, 30, 39), and the drive system (4) having at least one component (36) limiting movement of the drive system (4) which increases a distance between the drive system (4) and the base (5) such that a torque strain on the drive system (4) being braced by the base (5).

19. The drive for a mixer barrel according to claim 18, wherein the motor is one of a radial piston motor, an axial piston motor and an electric motor.

* * * * *